(12) United States Patent
Nojima et al.

(10) Patent No.: US 11,879,902 B2
(45) Date of Patent: Jan. 23, 2024

(54) TEST METHOD AND DISPENSING DEVICE

(71) Applicant: Hitachi High-Tech Corporation, Tokyo (JP)

(72) Inventors: Akihiro Nojima, Tokyo (JP); Takamichi Mori, Tokyo (JP); Isao Yamazaki, Tokyo (JP); Tetsuji Kawahara, Tokyo (JP); Youichi Aruga, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 482 days.

(21) Appl. No.: 17/268,347

(22) PCT Filed: Aug. 5, 2019

(86) PCT No.: PCT/JP2019/030626
§ 371 (c)(1),
(2) Date: Feb. 12, 2021

(87) PCT Pub. No.: WO2020/066300
PCT Pub. Date: Apr. 2, 2020

(65) Prior Publication Data
US 2021/0318344 A1    Oct. 14, 2021

(30) Foreign Application Priority Data
Sep. 25, 2018   (JP) .................................. 2018-179129

(51) Int. Cl.
*G01N 35/00* (2006.01)
*G01N 35/10* (2006.01)

(52) U.S. Cl.
CPC ....... *G01N 35/00623* (2013.01); *G01N 35/10* (2013.01); *G01N 35/1004* (2013.01)

(58) Field of Classification Search
CPC ............ G01N 35/00623; G01N 35/10; G01N 35/1004; G01N 2035/0437; G01N 2035/0446
See application file for complete search history.

(56) References Cited

U.S. PATENT DOCUMENTS

| 4,451,433 A * | 5/1984 | Yamashita | ............. G01N 35/02 422/65 |
| 2011/0092381 A1* | 4/2011 | Sood | .................... C12Q 1/6816 506/9 |

FOREIGN PATENT DOCUMENTS

| JP | 4909599 B2 | 4/2012 |
| JP | 2012220436 A | 11/2012 |

OTHER PUBLICATIONS

Search Report dated Oct. 15, 2019 in corresponding International Application No. PCT/JP2019/030626.
(Continued)

*Primary Examiner* — Tarun Sinha
(74) *Attorney, Agent, or Firm* — Miles & Stockbridge, P.C.

(57) ABSTRACT

An object of the present invention is to provide a test method capable of efficiently performing a step of evaluating a surface state of a dispensing probe provided in a dispensing apparatus. In the test method according to the present invention, a first solution in which a coloring matter is dissolved is dispensed to a first container in advance by a first dispensing probe, a second solution in which a coloring matter is not dissolved is dispensed to a second container in advance by the first dispensing probe and then the first solution and the second solution are respectively sucked and discharged by a second dispensing probe. After that, a surface state of the second dispensing probe is evaluated by acquiring an amount of the coloring matter collected by the second solution (see FIG. 2).

12 Claims, 7 Drawing Sheets

(56) References Cited

OTHER PUBLICATIONS

Written Opinion dated Oct. 15, 2019 in corresponding International Application No. PCT/JP2019/030626.

\* cited by examiner

TEST METHOD AND DISPENSING DEVICE

TECHNICAL FIELD

The present invention relates to a technique for evaluating a surface state of a dispensing probe.

BACKGROUND ART

A clinical chemistry analysis is a test for analyzing a component such as an inorganic ion, protein, urea, sugar, a lipid, an enzyme, a hormone, a drug, and a tumor marker in a biological sample such as blood and urine. In the clinical chemistry analysis, an automatic analysis apparatus is widely used. Except for a case where a disposable chip is used as the dispensing probe for dispensing a sample, the automatic analysis apparatus is used repeatedly by washing the dispensing probe with a washing mechanism.

In recent years, in the automatic analysis apparatus, reducing the amount of specimens and increasing sensitivity of an analysis have become important development trends. Therefore, from the viewpoint of reducing variations in a suction amount and a discharge amount and reducing contamination, it is required more than ever to keep a cleanliness of a surface of the dispensing probe at a high level.

PTL 1 describes a test method for confirming the cleanliness of a dispensing probe in order to evaluate an effect of washing a surface of the dispensing probe. In PTL 1, a coloring matter solution is dispensed by the dispensing probe, and then a solution which does not contain the coloring matter (for example, a physiological saline solution) is dispensed. When the coloring matter adheres to the dispensing probe, the coloring matter is introduced from the coloring matter solution to the solution which does not contain the coloring matter. The amount of the introduced coloring matter is calculated based on an absorbance measured by a spectrophotometer. A surface state of the dispensing probe is estimated by using the amount of the introduced coloring matter.

PTL 2 describes a technique for evaluating a washing unit that washes a dispensing probe and a stirrer provided in an automatic analysis apparatus. As an object of providing an automatic analysis apparatus which can easily confirm a washing performance, PTL 2 discloses a technique that a contamination unit contaminates a probe 21 for dispensing or a stirrer 25 for stirring with a coloring matter solution, a washing unit washes the contaminated probe 21 or the contaminated stirrer 25 with a washing water, a photometry portion 31 generates photometric data about a solution including a coloring matter solution attached to the washed probe 21 or the washed stirrer 25, and an evaluation unit 4 evaluates a washing capability of the washing unit with respect to the probe 21 or the stirrer 25 based on the generated photometric data (see Abstract).

CITATION LIST

Patent Literature

PTL 1: JP 4909599 B2
PTL 2: JP 2012-220436 A

SUMMARY OF INVENTION

Technical Problem

In a method described in PTL 1, time and effort are required for preparing bottles of a coloring matter solution used for inspecting a surface state of a dispensing probe, and removing the bottles after a test is completed. Therefore, in general, a test time tends to be long.

In the method described in PTL 2, in a washing pool 27, an outer wall of a probe 21 is washed by a first pump 55 sucking a pure water from a pure water tank 51 to extrude the pure water to an outer wall of the probe 21 and an inner wall of the probe 21 is washed by a third pump 61 sucking a pure water from the pure water tank 51 to discharge the pure water to a lumen of the probe 21. At this time, the washing capability of the washing unit is evaluated from the amount of the coloring matter collected in pure water, but it is difficult to obtain information on the surface state of the probe.

The present invention has been made in view of the above problems, and an object of the present invention is to provide a test method capable of efficiently performing a step of evaluating the surface state of the dispensing probe provided in the dispensing apparatus.

Solution to Problem

In the test method according to the present invention, a first solution in which a coloring matter is dissolved is dispensed to a first container in advance by a first dispensing probe, a second solution in which a coloring matter is not dissolved is dispensed to a second container in advance by the first dispensing probe and then the first solution and the second solution are respectively sucked and discharged by a second dispensing probe. After that, the surface state of the second dispensing probe is evaluated by acquiring an amount of the coloring matter collected by the second solution.

Advantageous Effects of Invention

In the test method according to the present invention, the surface state of the dispensing probe can be evaluated with repetition of a dispensing step by disposing each of the first container and the second container on a container disk provided in advance in an analysis apparatus and dispensing the first solution and the second solution in advance. Therefore, it is not necessary to newly install a member or the like for evaluating the surface state of the dispensing probe. Since it is only necessary to repeat the dispensing step, the test time can be reduced.

BRIEF DESCRIPTION OF DRAWINGS

FIG. 2 is a flowchart illustrating a procedure for evaluating a surface state of a sample dispensing probe 11a.

DESCRIPTION OF EMBODIMENTS

Embodiment 1

Figure 1:
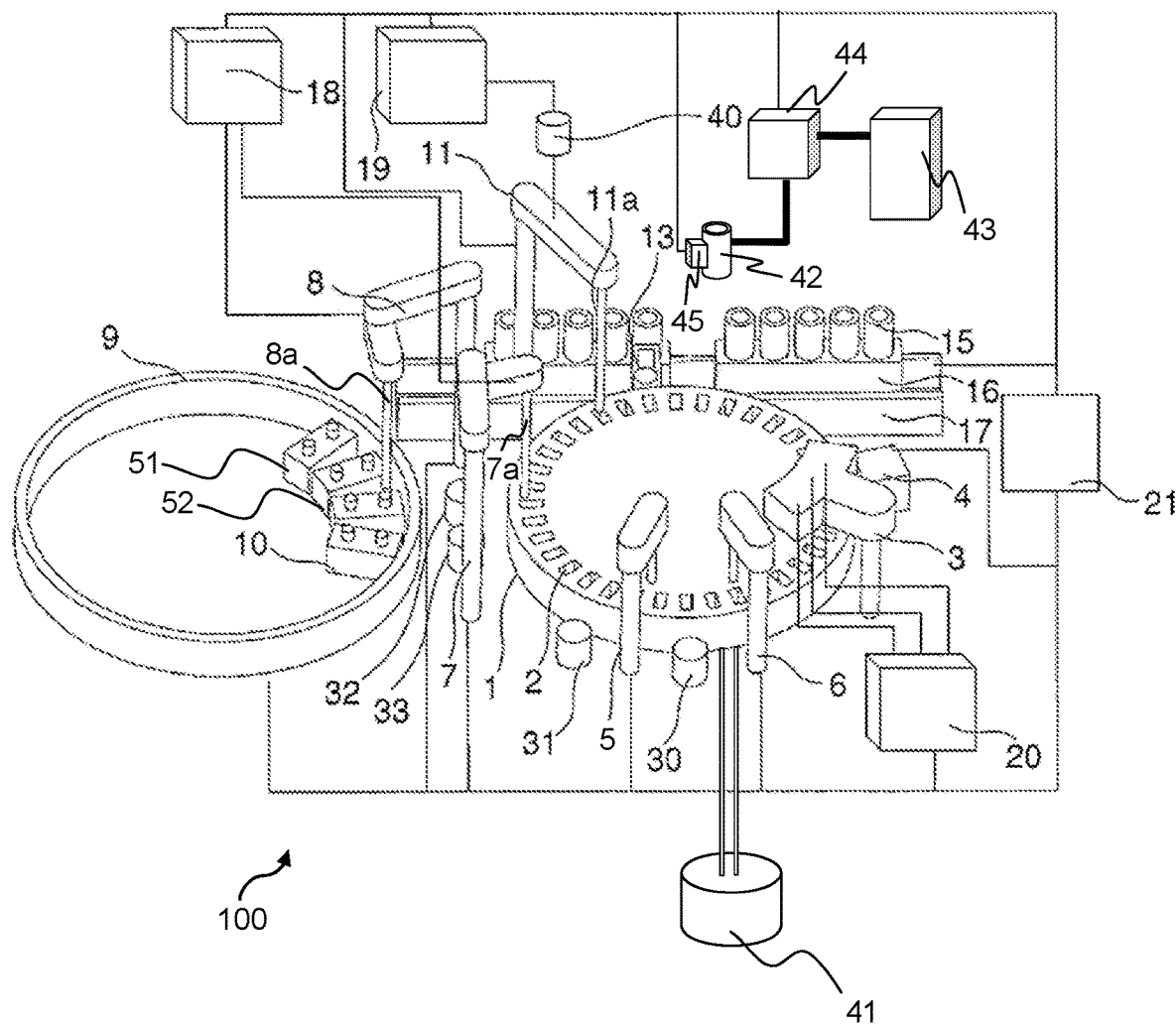
FIG. 1 is a schematic view of an automatic analysis apparatus 100 according to Embodiment 1.

FIG. 1 is a schematic view of an automatic analysis apparatus 100 according to

Embodiment 1. Since a function of each unit is known, detailed description thereof will be omitted. A reaction container 2 is arranged circumferentially on a reaction disk 1. The reaction container 2 is kept at a constant temperature by a thermostatic tank 41. A plurality of reagent bottles 10, 51, and 52 can be placed circumferentially in a reagent disk 9. A sample carrying mechanism 17 for moving a rack 16 on which a sample container 15 is placed is installed near the reaction disk 1. Reagent dispensing mechanisms 7 and 8 are installed between the reaction disk 1 and the reagent disk 9. A sample dispensing mechanism 11, which can rotate and moves up and down, is installed between the reaction disk 1 and the sample carrying mechanism 17. The sample dispensing mechanism 11 includes a sample dispensing probe 11a. A syringe for sample 19 is connected to the sample dispensing probe 11a. The sample dispensing probe 11a moves while drawing a circular arc around a rotation axis to dispense the sample to the reaction container 2 from the sample container 15. A pressure sensor 40 detects a pressure in the flow path inside the sample dispensing probe 11a.

A washing mechanism 3, a spectrophotometer 4, stirring mechanisms 5 and 6, and the like are disposed around the reaction disk 1. A washing pump 20 is connected to the washing mechanism 3. Washing tanks 33, 32, 13, 31 and 30 are respectively installed within an operating range of the reagent dispensing mechanisms 7 and 8, the sample dispensing mechanism 11, and the stirring mechanisms 5 and 6. The reagent dispensing mechanisms 7 and 8 include reagent dispensing probes 7a and 8a respectively. A syringe for reagent 18 is connected to the reagent dispensing mechanisms 7 and 8. The sample container 15 stores an inspection sample such as blood. The sample container 15 is placed on the rack 16 and carried by the sample carrying mechanism 17.

The sample dispensing probe 11a is normally washed by using the washing tank 13. In particular, when it is desired to strengthen the washing, the washing tank 42 is used for washing. A washing solution is supplied from a washing solution tank 43 to the washing tank 42 by a syringe for a washing solution 44. A washing acceleration mechanism 45 is installed in the washing tank 42, which enables stronger washing than being immersed in a washing solution. Examples of the washing acceleration mechanism 45 include an ultrasonic washer, and a heater. Each mechanism is controlled by a controller 21.

Figure 2:
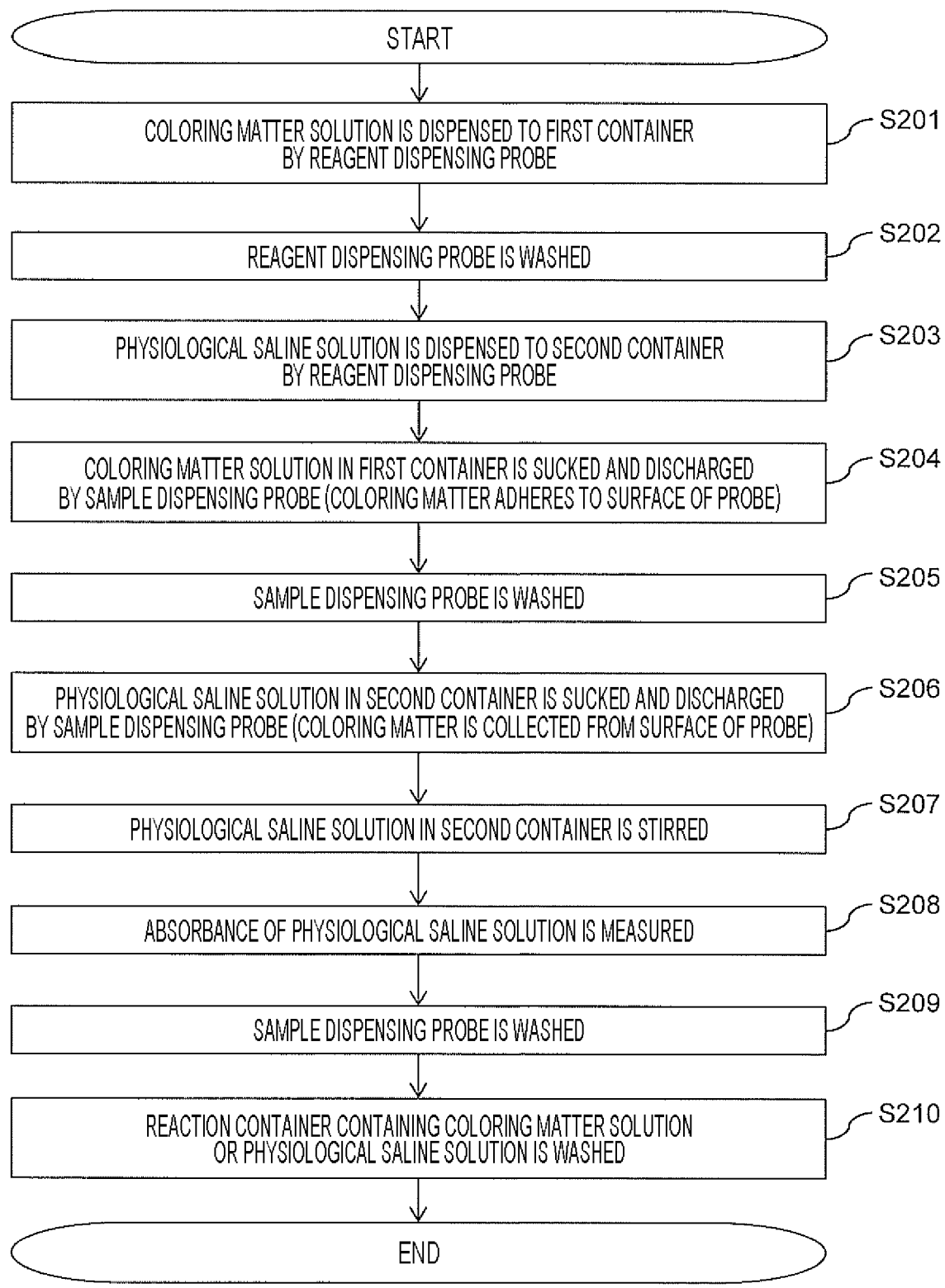

FIG. 2 is a flowchart illustrating a procedure for evaluating a surface state of the sample dispensing probe 11a. Before starting this flowchart, the reagent bottle 51 containing the coloring matter solution is placed on the reagent disk 9, and the reagent bottle 52 which contains the solution not containing the coloring matter is placed on the reagent disk 9. The reagent bottles 51 and 52 may be installed at all times. Hereinafter, a physiological saline solution is used as a solution which does not contain the coloring matter. However, in addition, as the solution which does not contain the coloring matter, it is considered to use a physiological saline solution containing a phosphate buffer solution or a surfactant, or a phosphate buffer solution, or the like. Each step in FIG. 2 will be described below.

(FIG. 2: Steps S201 to S203)

The reagent disk 9 is rotated and moved to a position in which the reagent dispensing probe 7a (or the reagent dispensing probe 8a, the followings are the same) is accessible to the reagent bottle 51. The coloring matter solution is dispensed to the reaction container 2 (the first container) from the reagent bottle 51 by the reagent dispensing probe 7a (S201). The reagent dispensing probe 7a used is sufficiently washed in the washing tank 32 or 33 (S202). The reagent disk 9 is rotated and the physiological saline solution is dispensed from the reagent bottle 52 to a reaction container 2 (a second container) which is different from the reaction container to which the coloring matter solution is dispensed by the reagent dispensing probe 7a (S203).

(FIG. 2: Step S204)

The reaction disk 1 is rotated, the coloring matter solution, which is dispensed previously to the reaction container 2 (the first container) by the sample dispensing probe 11a, is sucked, and the coloring matter solution is discharged again into the same reaction container 2 (the first container). As a result, the coloring matter adheres to the inner wall of the sample dispensing probe 11a.

(FIG. 2: Step S204: Supplement 1)

In this step, a syringe for sample 19 may be moved in a state in which the sample dispensing probe 11a is stopped. After sucking the coloring matter solution, the sample dispensing probe 11a may be pulled up from the coloring matter solution, and then immersed in the coloring matter solution again to discharge the coloring matter solution.

(FIG. 2: Step S204: Supplement 2)

In the test method according to Embodiment 1, the sample dispensing mechanism 11 does not need to be moved to the sample container 15 or the reaction container 2, and the test can be performed by repeating the suctioning and discharging of the coloring matter solution or the solution which does not contain the coloring matter. Therefore, in this flowchart, the test can be completed in a short time by comparing the operation in the test method with an operation at the time of performing a normal analysis, that is, a series of operations in which the sample dispensing probe 11a sucks the sample from the sample container 15 and discharges the sample to the reaction container 2. For example, the coloring matter solution can be sucked and discharged multiple times in the test method within the time required to perform the operation of sucking the sample and the operation of discharging the sample to the reaction container 2 in the normal analysis operation. For example, the sample can be sucked and discharged two times in this step within the time required to suck and discharge the sample once in the normal analysis operation. As described above, since this step can be performed in a shorter time than the time of sucking and discharging the sample in the normal analysis operation, the time required for the test can be further reduced. This step may be repeated to increase reliability of data.

(FIG. 2: Step S205)

The sample dispensing probe 11a is washed in the washing tank 13 or 42. The washing may be performed only in the washing tank 13 or in both the washing tanks 13 and 42. The washing may be performed once or may be repeated. Since this step is for removing components that are clearly unnecessary in the subsequent steps, such as droplets adhering to the sample dispensing probe 11a, it is not necessary to completely wash the coloring matter adhering to the surface of the sample dispensing probe 11a.

(FIG. 2: Step S205: Supplement)

Similar to Step S204, this step may be performed together with the normal analysis operation, or may be performed at a timing different from the analysis operation for the purpose of increasing the number of repetitions.

(FIG. 2: Step S206)

Similar to the sucking and discharging of the coloring matter solution, the physiological saline solution, which is dispensed to the reaction container 2 (the second container), is sucked by the sample dispensing probe 11a, and the physiological saline solution is discharged again to the same reaction container 2 (the second container) by the sample dispensing probe 11a. In the above steps, the coloring matter remaining on the surface of the sample dispensing probe 11a when the sample dispensing probe 11a dispenses the coloring matter solution is collected by the physiological saline solution.

(FIG. 2: Step S206: Supplement)

Similar to Step S204, this step may be performed in a state in which the sample dispensing probe 11a is stopped, and the sample dispensing probe 11a may be immersed in the physiological saline solution again to discharge the physiological saline solution after the sample dispensing probe 11a sucks the physiological saline solution and then is pulled up from the physiological saline solution. Similar to Step S204, this step can also be performed together with the normal analysis operation. Similar to Step S204, this step may also be repeated to increase reliability of data.

(FIG. 2: Steps S207 to S208)

The coloring matter is dispersed uniformly in the physiological saline solution by stirring the physiological saline solution in the reaction container 2 (the second container) with stirring mechanisms 5 and 6 (S207). The absorbance of the physiological saline solution in the reaction container 2 (the second container) is measured by the spectrophotometer 4 (S208).

(FIG. 2: Steps S209 to S210)

The sample dispensing probe 11a is washed in the washing tanks 13 and 42 (S209), and the reaction container 2 (the first container and the second container) containing the coloring matter solution or the physiological saline solution is washed (S210).

From the absorbance measured in Step S208, the amount of coloring matter remaining on the surface of the sample dispensing probe 11a can be estimated. Specifically, the amount of the coloring matter introduced to the physiological saline solution from the surface of the sample dispensing probe 11a can be defined by the following formula 1. The absorbance of the solution to which the coloring matter is introduced can be measured by the spectrophotometer 4. The absorbance of the coloring matter solution and the absorbance of the solution which does not contain the coloring matter can be measured by the spectrophotometer 4, and a result measured in advance can be stored in advance in the controller 21. When measuring the absorbance with the spectrophotometer 4, it is necessary to prepare a solution which does not contain a coloring matter, the solution being not used in the coloring matter introducing test, in order to measure the absorbance. A concentration of the coloring matter solution and a volume of the solution to which the coloring matter is introduced can be acquired from the dispensing amount.

Amount of introduced coloring matter (mass)={(absorbance of solution to which coloring matter is introduced−absorbance of solution which does not contain coloring matter)/(absorbance of coloring matter solution−absorbance of solution which does not contain coloring matter)} concentration of coloring matter solution×volume of solution to which coloring matter is introduced (1)

The higher the absorbance of the coloring matter solution, the greater the amount of the introduced coloring matter. Therefore, higher sensitivity can be obtained. However, when the absorbance of the coloring matter solution exceeds the upper limit of measurement of the spectrophotometer 4, it is difficult to directly measure the absorbance of the coloring matter solution. In this case, the absorbance of the solution in which the coloring matter solution is diluted can be measured, and the absorbance of a coloring matter stock solution can be obtained by the following formula 2 from the result of the measurement.

Absorbance of coloring matter stock solution=(absorbance of diluted solution−absorbance of solution which does not contain coloring matter)×dilution rate+absorbance of solution which does not contain coloring matter (2)

Embodiment 1: Summary

In the test method according to Embodiment 1, the coloring matter solution is dispensed in advance to the first container by the reagent dispensing probe 7a (a first dispensing probe), and the physiological saline solution is dispensed in advance to the second container. Next, the coloring matter solution in the first container is sucked and discharged by the sample dispensing probe 11a (the second dispensing probe), and the physiological saline solution in the second container is sucked and discharged by the sample dispensing probe 11a. In this sucking and discharging process, the surface state of the sample dispensing probe 11a can be evaluated by calculating the amount of the coloring matter introduced to the physiological saline solution from the surface of the sample dispensing probe 11a.

In the test method according to Embodiment 1, the test can be performed by the sample dispensing probe 11a only repeating the dispensing and discharging with respect to the reaction container 2 on the reaction disk 1, and a user does not need to provide a new material and equipment or a new component in order to perform the test method since the user does not need to prepare the reagent bottles 51 and 52 by placing the reagent bottles in advance. Therefore, a test cost, a test time, and a labor of the user can be remarkably suppressed.

Embodiment 2

Figure 3:
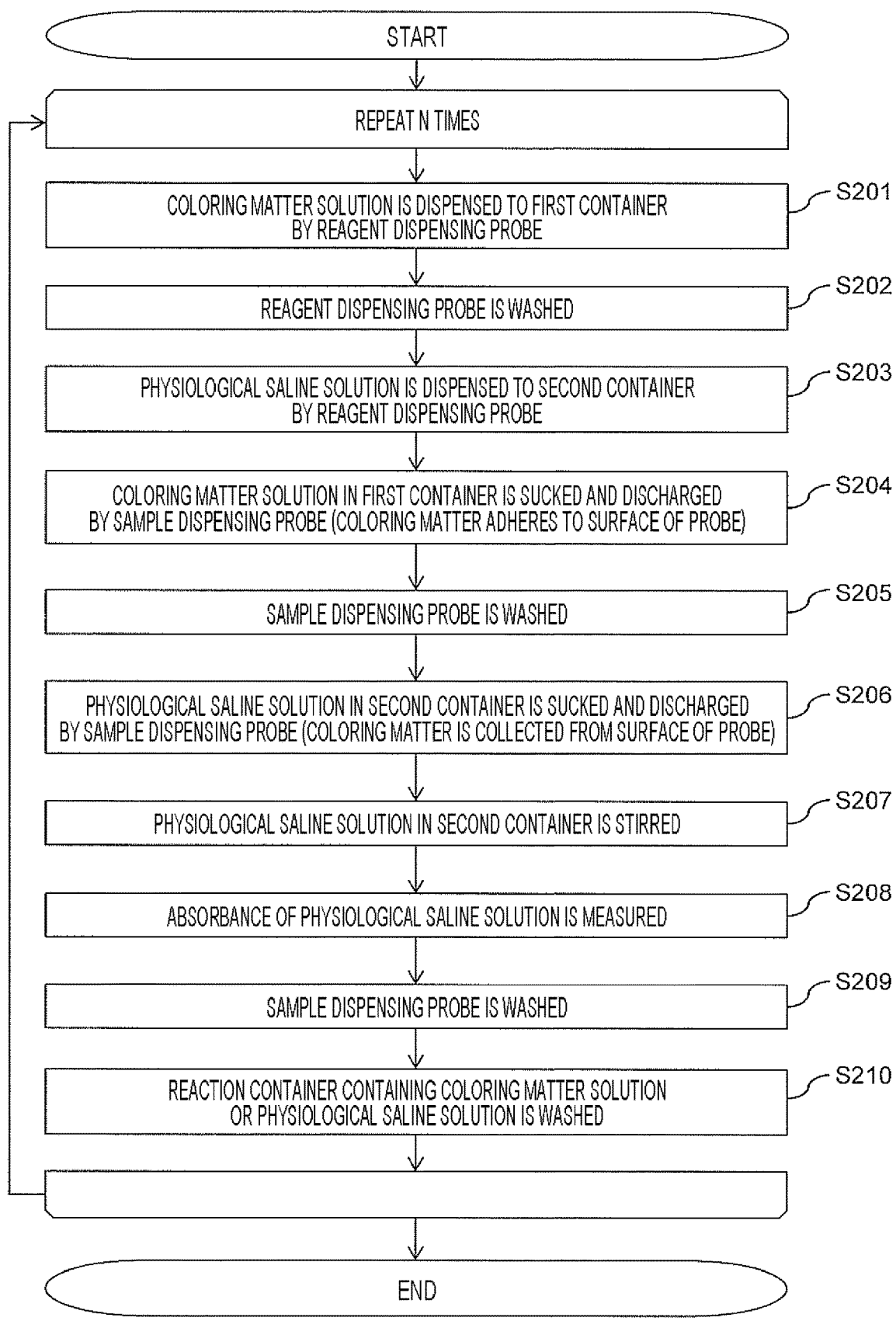
FIG. 3 is a flowchart illustrating a procedure for evaluating a surface state of a sample dispensing probe 11a according to Embodiment 2.

FIG. 3 is a flowchart illustrating a procedure for evaluating the surface state of the sample dispensing probe 11a according to Embodiment 2. In order to improve reliability of the test method, it is considered to repeat the procedure described in Embodiment 1 multiple times. For example, as shown in FIG. 3, the procedure described in FIG. 2 is repeated multiple times (for example, three times). Therefore, since the surface state of the sample dispensing probe 11a can be evaluated by using an average value obtained by performing the procedure three times, the reliability of the test is improved.

Embodiment 3

In Embodiment 2, it has been described that the same procedure as in Embodiment 1 is repeated. In order to reduce the test time of the procedure described in Embodiment 2, it is considered that a plurality of the reaction containers 2 to which the physiological saline solution is dispensed are prepared in advance, and the coloring matter solution, which is dispensed to one reaction container 2 (the first container), is used repeatedly. In Embodiment 3 of the present invention, a specific procedure thereof will be described.

Figure 4:
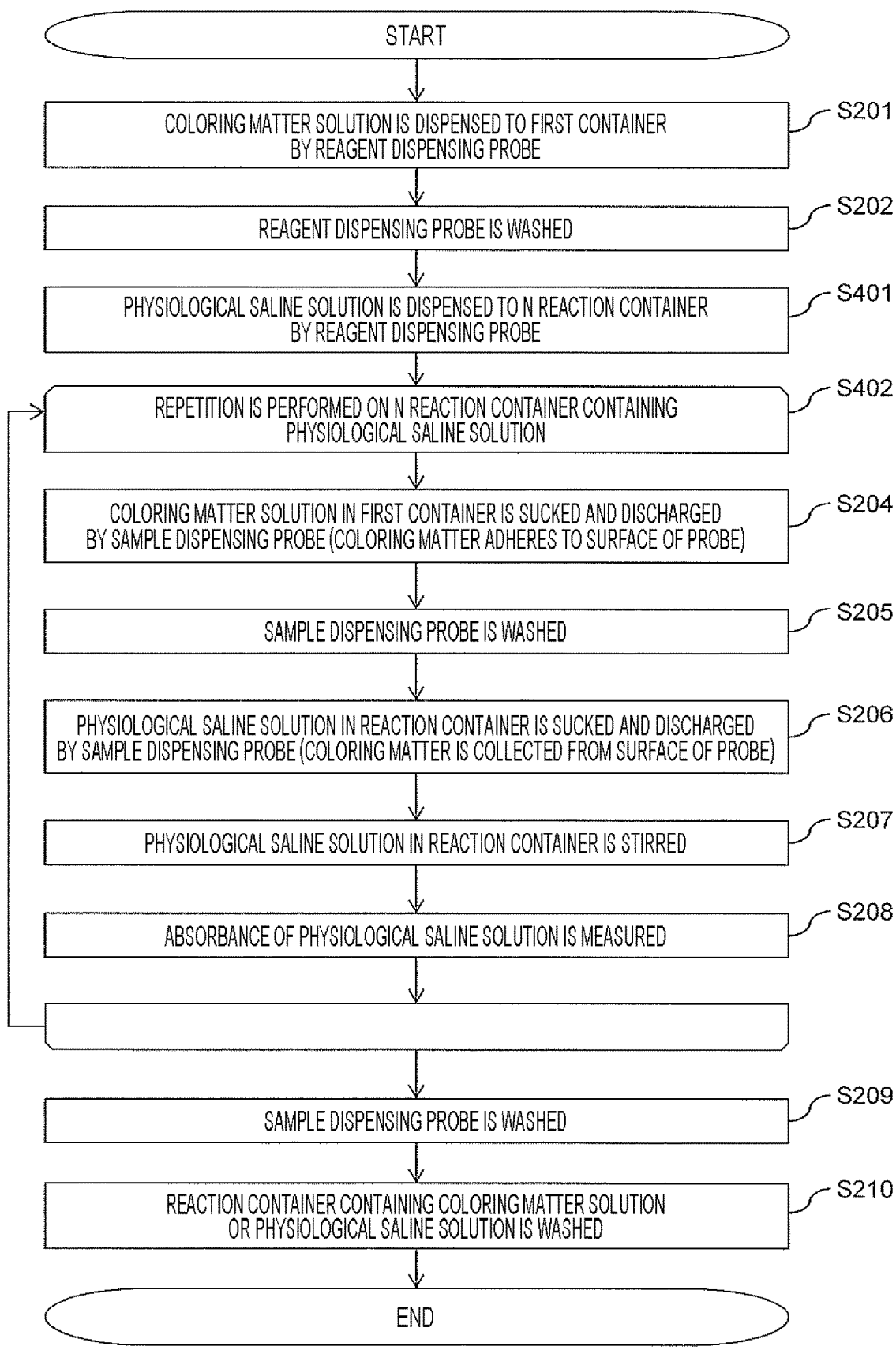
FIG. 4 is a flowchart illustrating a procedure for evaluating a surface state of a sample dispensing probe 11a according to Embodiment 3.

FIG. 4 is a flowchart illustrating the procedure for evaluating the surface state of the sample dispensing probe 11a according to Embodiment 3. In this flowchart, Step S401 is performed instead of Step S203 described in FIG. 2. Steps S204 to S208 are repeated as described later. Since the others are the same as in FIG. 2, the steps different from the steps in FIG. 2 will be mainly described below.

(FIG. 4: Step S401)

Similar to Step S203, the physiological saline solution is dispensed from the reagent bottle 52 to the reaction container 2 which is different from the reaction container to which the coloring matter solution is dispensed by the reagent dispensing probe 7a. However, in this step, unlike Embodiment 1, the physiological saline solution is dispensed to N (N≥2) reaction containers 2 in a similar way. In the above steps, the coloring matter solution is dispensed to one reaction container 2 (the first container), and the physiological saline solution is dispensed to N reaction containers 2 which are different from the reaction container (the first container).

(FIG. 4: Step S402)

Steps S204 to S208 are repeated. In each repetition, the reaction container 2 (the first container) to which the coloring matter solution is dispensed is used in common, and a different reaction container 2 for each repetition is used as the reaction container 2 to which the physiological saline solution is dispensed. That is, the reaction disk 1 is rotated to the same position every time with respect to the reaction container 2 to which the coloring matter solution is dispensed, and the reaction disk 1 is rotated to a position of the different reaction container 2 every time repeating is performed with respect to the reaction container 2 to which the physiological saline solution is dispensed.

In Step S204, since the coloring matter solution is repeatedly sucked and discharged to the same container, an amount of the coloring matter solution in the reaction container 2 (the first container) is not reduced. Therefore, in Embodiment 3, the coloring matter solution can be saved by using the coloring matter solution in the same reaction container 2 (the first container) repeatedly. The test time can be reduced by preparing a plurality of the containers containing the physiological saline solution in advance.

In the test method according to Embodiment 3, Steps S209 and S210 can be performed after the repetition is completed. Steps S209 and S210 is required to take a relatively long time since the sample dispensing probe 11a and each container are completely washed. Therefore, in the test method according to Embodiment 3, the test time can be reduced compared with Embodiment 2. In Embodiment 3, the method for dispensing the coloring matter solution has been described, but the physiological saline solution may be dispensed first.

Embodiment 4

In Embodiment 1, an operation example in which the coloring matter solution is sucked and discharged to the same reaction container 2 (the first container), and the physiological saline solution is sucked and discharged to the same reaction container 2 (the second container) is described. Alternatively, both the coloring matter solution and the physiological saline solution may be discharged to an empty reaction container 2. In Embodiment 4 of the present invention, a specific procedure thereof will be described.

Figure 5:
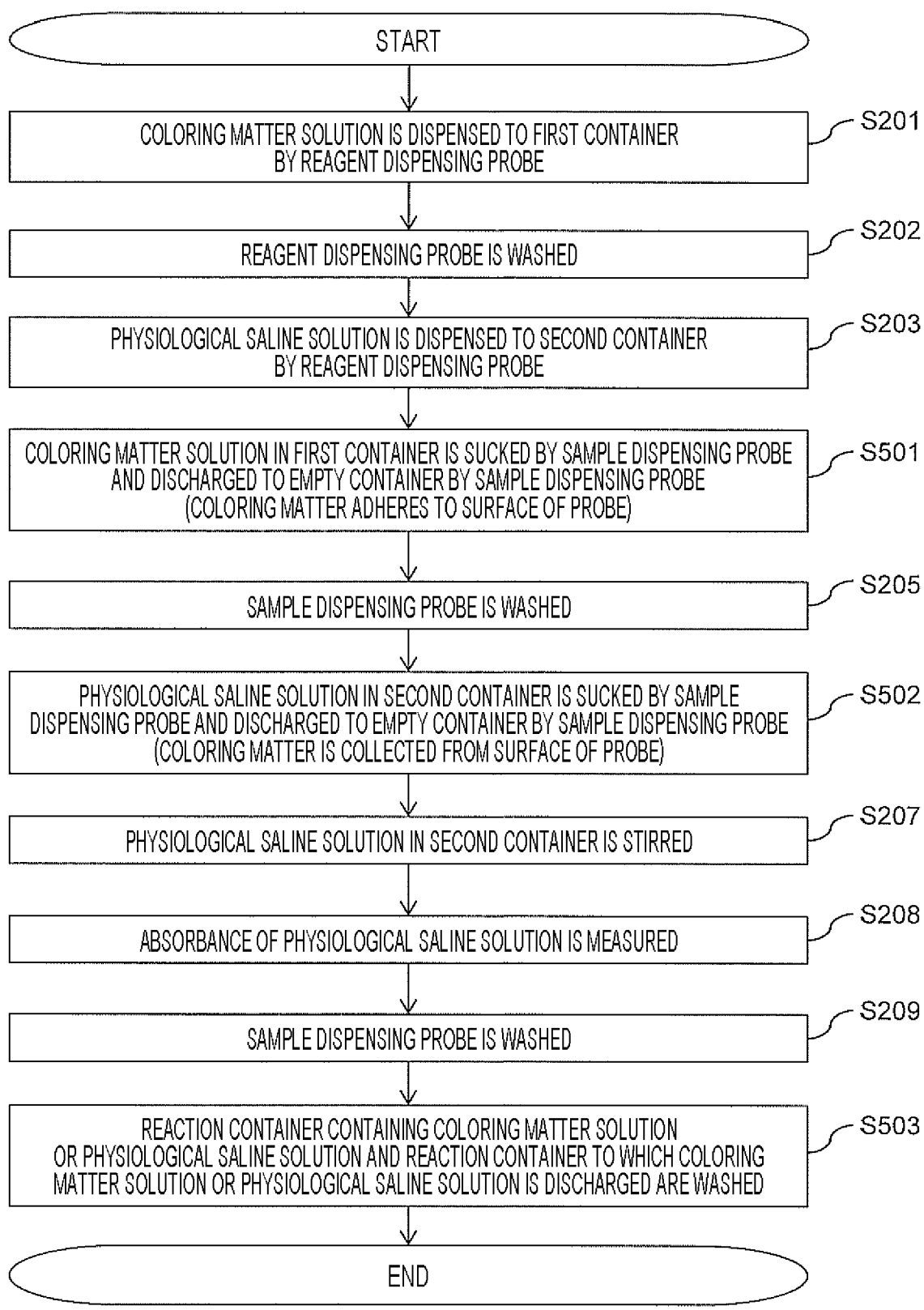
FIG. 5 is a flowchart illustrating a procedure for evaluating a surface state of a sample dispensing probe 11a according to Embodiment 4.

FIG. 5 is a flowchart illustrating the procedure for evaluating the surface state of the sample dispensing probe 11a according to Embodiment 4. In this flowchart, Step S501 is performed instead of Step S204 described in FIG. 2, Step S502 is performed instead of Step S206 described in FIG. 2, and Step S503 is performed instead of step S210 described in FIG. 2. Since the others are the same as in FIG. 2, the steps different from the steps in FIG. 2 will be mainly described below.

(FIG. 5: Step S501)

The reaction disk 1 is rotated, and the coloring matter solution, which is dispensed previously to the reaction container 2 (the first container) by the sample dispensing probe 11a, is sucked. After that, the sucked coloring matter solution is discharged to the empty reaction container 2. When the sample dispensing probe 11a can approach the empty reaction container 2 without rotating the reaction disk 1, it is not necessary to further rotate the reaction disk 1.

(FIG. 5: Step S502)

Similar to the sucking and discharging of the coloring matter solution, the physiological saline solution, which is dispensed to the reaction container 2 (the second container), is sucked by the sample dispensing probe 11a, and the physiological saline solution is discharged to the empty reaction container 2 by the sample dispensing probe 11a. Similar to Step S501, when the sample dispensing probe 11a can approach the empty reaction container 2 without rotating the reaction disk 1, it is not necessary to further rotate the reaction disk 1. When the physiological saline solution cannot be dispensed in an amount required for photometry in S208 by the sample dispensing probe dispensing the physiological saline solution one time, this dispensing operation may be repeated multiple times.

Embodiment 5

Figure 6:
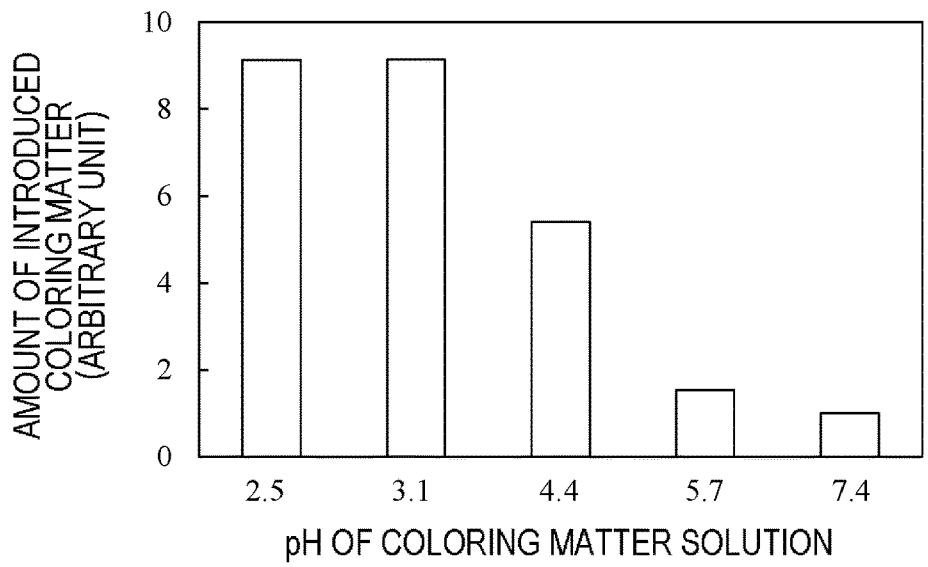
FIG. 6 is a graph illustrating a result of an experiment on a relationship between pH of a coloring matter solution used in Embodiments 1 to 4 and an amount of an introduced coloring matter.

FIG. 6 is a graph illustrating a result of an experiment on a relationship between pH of a coloring matter solution used in Embodiments 1 to 4 and an amount of an introduced coloring matter. The results shown in FIG. 6 is obtained by using an acid coloring matter orange G as the coloring matter in the test method according to the embodiments described above. As shown in FIG. 6, the amount of the introduced coloring matter is increased at pH of 6.0 or less. When the amount of the introduced coloring matter is increased, a test sensitivity is improved since the surface state of the probe can be obtained more accurately. Specifically, it can be seen that when pH is lowered to 3.0, the sensitivity is improved by about 5 times compared to the case where pH is 7.4.

However, in a case where pH was lowered to 2.0 or less of a strong acid condition, when the test was performed repeatedly, a phenomenon was observed in which the test result became unstable due to an effect of damage to the surface of the sample dispensing probe 11a. Therefore, it can be said that pH of the coloring matter solution is preferably 2.0 to 6.0.

Embodiment 6

In the above embodiments, when there are a plurality of washing mechanisms for washing the reaction container 2, it is necessary to efficiently perform the test by using the washing mechanism. However, since the position of the washing mechanism is fixed, it is necessary to devise the arrangement of the reaction container 2. In Embodiment 6 of the present invention, a specific operation example will be described.

Figure 7:
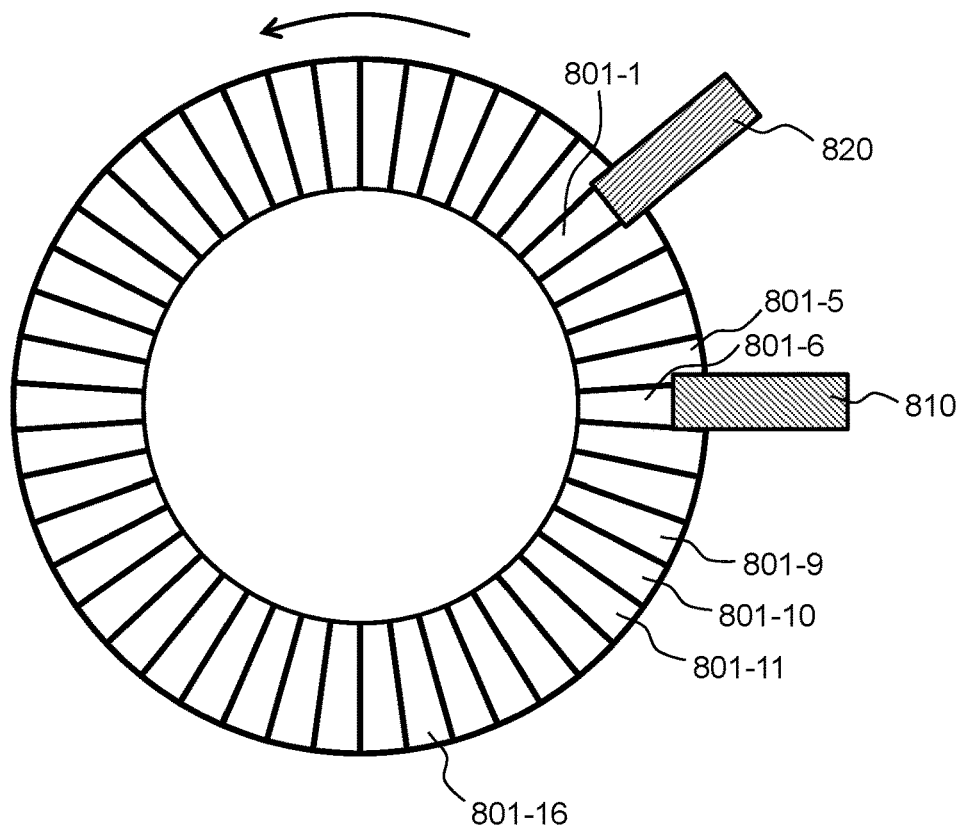
FIG. 7 is a top view of an automatic analysis apparatus 100 provided with two washing mechanism.

FIG. 7 is a top view of an automatic analysis apparatus 100 provided with two washing mechanism. For example, a strong washing can be performed by a washing mechanism 810 washing the reaction container 2 with a chemical liquid and a washing mechanism 820 washing the reaction container 2 with a pure water. Further, when a plurality of the washing mechanisms are provided, the test can be performed more efficiently by selecting the reaction container 2 to be used based on a positional relationship of the washing mechanisms. The specific procedure will be described below.

As shown in FIG. 7, it is assumed that the washing mechanisms 810 and 820 are separated by five reaction containers. Each of the coloring matter solution and the physiological saline solution are dispensed alternately to reaction containers separated by five reaction containers, for example, the coloring matter solution is dispensed to a reaction container 801-1, and the physiological saline solution is dispenses to a reaction container 801-6, 801-11, 801-16, or the like. According to this, the washing procedure is as follows.

First, the reaction container 801-1 is washed with the washing mechanism 810. Next, the reaction disk 1 is rotated counterclockwise by five reaction containers. As a result, the reaction container 801-6 is disposed in the position of the washing mechanism 810, and the reaction container 801-1 is disposed in the position of the washing mechanism 820. Next, the reaction container 801-1 is washed with the washing mechanism 820, and the reaction container 801-6 is washed with the washing mechanism 810. The reaction disk 1 is rotated, the reaction container 801-6 is disposed in the position of the washing mechanism 820, and the reaction container 801-11 is disposed in the position of the washing mechanism 810. The reaction container 801-6 is washed with the washing mechanism 820, and the reaction container 801-11 is washed with the washing mechanism 810. In this way, a plurality of the reaction containers can be washed at the same time by determining the reaction container to be used in consideration of the positional relationship between the washing mechanism 810 and the washing mechanism 820. As a result, the test can be performed efficiently.

On the other hand, when the reaction containers are used in an order of reaction containers 801-1, 801-1, 801-9, 801-13, and the like, the reaction container 801-5 cannot be washed when the reaction container 801-1 is being washed with the washing mechanism 820 since the reaction container 801-5 is not in the position of the washing mechanism 810. Therefore, after the reaction container 801-1 is washed with the washing mechanism 810, the reaction disk 1 is rotated, and the reaction container 801-5 comes to the position of the washing mechanism 810. After this, the reaction disk 1 is rotated to move the reaction container 801-1 to the position of the washing mechanism 820. In this way, since only one reaction container can be washed at a time, the efficiency of the test decreases.

In FIG. 7, the case of having two washing mechanisms has been described, but the test efficiency can also be improved by determining the reaction container to be used appropriately in the case of having three washing mechanisms.

Embodiment 7

Figure 8:
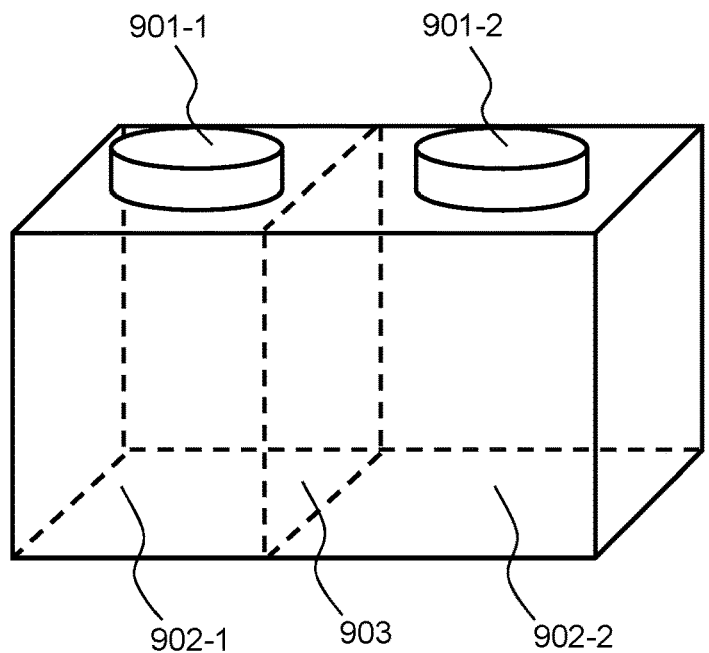
FIG. 8 is a view illustrating a configuration example of a reagent bottle according to Embodiment 7.

FIG. 8 is a view illustrating a configuration example of a reagent bottle according to Embodiment 7. In the above embodiments, the coloring matter solution is contained in the reagent bottle 51, and the physiological saline solution is contained in the reagent bottle 52, but the coloring matter solution and the physiological saline solution may be contained in one reagent bottle. FIG. 8 is an example of the reagent bottle in this case. This reagent bottle has two or more suction ports so that the coloring matter solution may be dispensed from one probe insertion port 901-1 and the physiological saline solution may be dispensed from the other probe insertion port 901-2. Inside the reagent bottle, the region containing these two kinds of solutions are partitioned into two regions 902-1 and 902-2 by a partition plate 903 so that the coloring matter solution and the physiological saline solution are not mixed.

Volumes of the regions 902-1 and 902-2 do not have to be the same, and it is considered that the volumes vary depending on a usage ratio of the coloring matter solution and the physiological saline solution. That is, when the ratio of the coloring matter solution to the physiological saline solution used in one test is 1:3, the waste of the coloring matter solution and the physiological saline solution is eliminated by setting the volume ratio of the region 902-1 to the region 902-2 to 1:3. For example, the partition plate 903 does not have to be in a center of the bottle.

Figure 9:
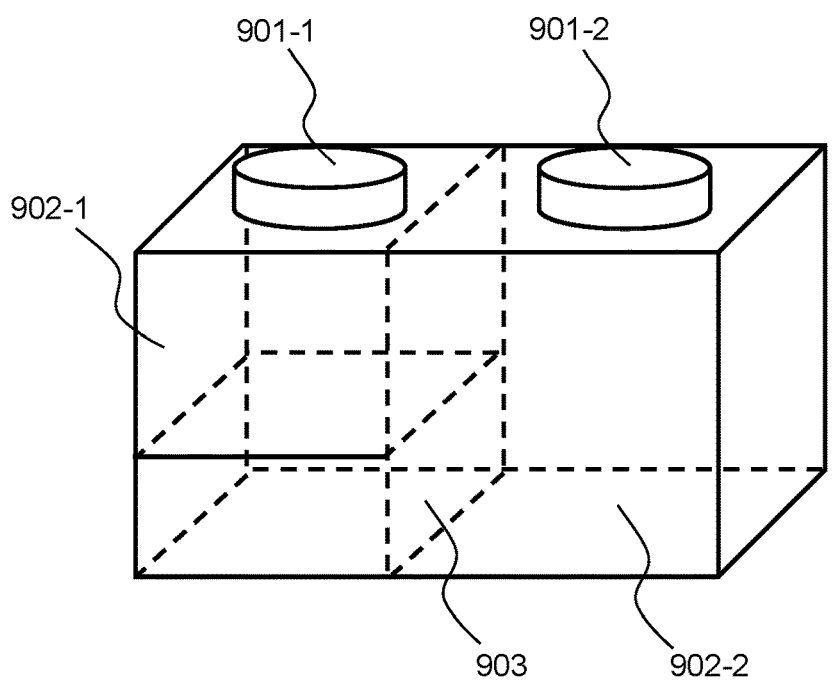
FIG. 9 is a modification example of a region in a reagent bottle.

FIG. 9 is a modification example of a region in a reagent bottle. As shown in FIG. 9, the volume ratio in the region can be changed by changing the height of the region. As a result, the volume ratio of the solution can be changed for each region in the same manner as described above.

When the reagent dispensing probe 7a is configured to rotate about a support column, the reagent dispensing probe 7a can only be moved along the circumference. Therefore, when the coloring matter solution and the physiological saline solution are contained in different bottles respectively, each bottle needs to be arranged along the circumference. On the other hand, when the reagent dispensing probe 7a includes a first arm that rotates about a support column and a second arm that is rotatably attached to the first arm, and can rotate in two stages, a movement trajectory of the probe is not limited to the circumference. Therefore, as in Embodiment 7, it is possible to use a bottle in which two suction ports are arranged side by side in a straight line.

About Modification Example of Present Invention

The present invention is not limited to the above-described embodiments, and various modification examples are included. For example, the above embodiments have been described in detail in order to describe the present invention in an easy-to-understand manner, and are not necessarily limited to those including all the described configurations. Further, it is possible to replace a part of the configurations of one embodiment with the configuration of another embodiment, and it is also possible to add the configuration of another embodiment to the configuration of a certain embodiment. It is possible to perform addition, deletion, and replacement of other configurations with respect to a part of the configurations of each embodiment.

When a plurality of the reaction containers 2 containing the physiological saline solution are used as in Embodiments 2 to 3, the sample dispensing probe 11a may be simply only immersed in the coloring matter solution and the physiological saline solution without sucking and discharging some of the physiological saline solutions. Accordingly, it possible to grasp the effect of the coloring matter on an outer surface of the sample dispensing probe 11a. In addition, it is possible to obtain information on both the surface states of an inner surface and the outer surface of the sample dispensing probe 11a by sucking and discharging some of the physiological saline solutions without sucking and discharging the other physiological saline solutions. The coloring matter can also adhere to the outer surface of the sample dispensing probe 11a by immersing and pulling up the sample dispensing probe 11a without sucking and discharging the coloring matter solution. The procedure for evaluating the surface state based on the amount of the coloring matter is the same as in Embodiment 1.

In the above embodiments, when the result of a coloring matter introducing test shows that the amount of the introduced coloring matter exceeds a threshold, the controller 21 may output the result and may urge maintenance or replacement of the sample dispensing probe 11a. As an output format, it is considered to include storing data indicating the result in a storage device included in the controller 21, a screen display, and the like. Further, the test result may be transmitted from the automatic analysis apparatus 100 to a server computer, and the server computer may determine whether or not the maintenance is required.

In the above embodiments, the evaluation of the surface state of the sample dispensing probe 11a has been described, but the present invention can also be applied to other dispensing probes (for example, the reagent dispensing probe).

Reference Signs List 3 washing mechanism
4 spectrophotometer
5 stirring mechanism
6 stirring mechanism
7 reagent dispensing mechanism
7a reagent dispensing probe
8 reagent dispensing mechanism
8a reagent dispensing probe
9 reagent disk
10 reagent bottle
11 sample dispensing mechanism
11a sample dispensing probe
13 washing tank
14 washing tank
15 sample container
16 rack
17 sample carrying mechanism
18 syringe for reagent
19 syringe for sample
20 washing pump
21 controller
30 washing tank
31 washing tank
32 washing tank
33 washing tank
36 pump
40 pressure sensor
41 thermostatic tank
42 washing tank
43 washing solution tank
44 syringe for washing solution
45 washing acceleration mechanism
46 washing solution
51 reagent bottle
52 reagent bottle
801-1 reaction container
801-5 reaction container
801-6 reaction container
801-9 reaction container
801-10 reaction container
810 washing mechanism
820 washing mechanism
901-1 probe insertion port
901-2 probe insertion port
902-1 region
902-2 region
903 partition plate

The invention claimed is:

1. A test method that evaluates a surface state of a dispensing probe provided in a dispensing apparatus that dispenses a liquid sample, the method comprising:
a first dispensing step of causing a first dispensing probe provided in the dispensing apparatus to dispense a first solution in which a coloring matter is dissolved to a first container;
a second dispensing step of causing the first dispensing probe to dispense a second solution in which a coloring matter is not dissolved to a second container different from the first container;
a first sucking and discharging step of causing a second dispensing probe different from the first dispensing probe provided in the dispensing apparatus to suck the first solution in the first container and discharge the sucked first solution from the second dispensing probe;
a second sucking and discharging step of causing the second dispensing probe to suck the second solution in the second container and discharge the sucked second solution from the second dispensing probe;
a step of calculating an amount of the coloring matter collected by the second solution, the coloring matter remaining on the second dispensing probe, by calculating an amount of the coloring matter contained in the second solution discharged from the second dispensing probe; and
a step of evaluating a surface state of the second dispensing probe based on the amount of the coloring matter collected by the second solution,
wherein the test method further comprises a first washing step of washing the first container by using a washing mechanism after the first sucking and discharging step is completed, and
wherein
at a time before the first dispensing step and the second dispensing step, the first solution and the second solution are contained in a bottle of which an inside is partitioned by a partition,
the first dispensing probe includes a first arm which is rotatably attached to a support column, and a second arm which is rotatably attached to the first arm, in the first dispensing step, the first solution is dispensed to the first container from the bottle, and
in the second dispensing step, the second solution is dispensed to the second container from the bottle.

2. The test method according to claim 1, in which the dispensing apparatus includes the first container and the second container on a rotatable disk, the method further comprising:
a step of causing the first dispensing probe to dispense the first solution to the first container, and then rotating the disk to a position in which the first dispensing probe is capable of dispensing the second solution to the second container; and
a step of causing the second dispensing probe to discharge the first solution, and then rotating the disk to a position in which the second dispensing probe is capable of sucking the second solution in the second container.

3. The test method according to claim 1, further comprising a repeating step of repeating the first sucking and discharging step and the second sucking and discharging step to evaluate the surface state of the second dispensing probe repeatedly.

4. The test method according to claim 3, further comprising a third dispensing step of causing the first dispensing probe to dispense the second solution to a third container different from the first container and the second container,
wherein in the repeating step, each step is performed in an order of the first sucking and discharging step, the second sucking and discharging step, the first sucking and discharging step, and a third sucking and discharging step of causing the second dispensing probe to suck the second solution in the third container and to discharge the sucked second solution from the second dispensing probe.

5. The test method according to claim 3, wherein in the first sucking and discharging step, the first solution in the first container is used repeatedly by discharging the first solution sucked from the first container by the second dispensing probe to the first container.

6. The test method according to claim 1, wherein
in the first sucking and discharging step, the first solution sucked from the first container by the second dispensing probe is discharged to an empty container, and
in the second sucking and discharging step, the second solution sucked from the second container by the second dispensing probe is discharged to the empty container.

7. The test method according to claim 1, wherein the coloring matter is an acid coloring matter, and pH of the first solution is 2.0 or more and 6.0 or less.

8. The test method according to claim 7, wherein the coloring matter is orange G.

9. The test method according to claim 1, in which the dispensing apparatus further includes the washing mechanism that washes the first container and the second container, the method further comprising:
the first washing step of washing the first container by using the washing mechanism after the first sucking and discharging step is completed; and
the second washing step of washing the second container by using the washing mechanism after the second sucking and discharging step is completed,
wherein the first washing step and the second washing step are performed at the same time.

10. The test method according to claim 9, wherein
the dispensing apparatus includes the first container and the second container on a rotatable disk, and the washing mechanism includes a first washing unit and a second washing unit which are disposed respectively along a circumference of the disk, and
in the first washing step and the second washing step, on the disk, each of the first container and the second container is disposed in a position in which the second washing unit is capable of washing the second container when the first washing unit washes the first container.

11. A test method that evaluates a surface state of a dispensing probe provided in a dispensing apparatus that dispenses a liquid sample, the method comprising:
a first dispensing step of causing a first dispensing probe provided in the dispensing apparatus to dispense a first solution in which a coloring matter is dissolved to a first container;
a second dispensing step of causing the first dispensing probe to dispense a second solution in which a coloring matter is not dissolved to a second container different from the first container;
a step of attaching the coloring matter to an outer surface of the second dispensing probe by immersing the second dispensing probe in the first solution and then pulling up the second dispensing probe from the first solution without sucking the first solution;
a step of immersing the second dispensing probe of which the outer surface the coloring matter is attached to in the second solution and then pulling up the second dispensing probe from the second solution without sucking the second solution;
a step of calculating an amount of the coloring matter introduced to the second solution from the coloring matter remaining on the outer surface of the second dispensing probe; and
a step of evaluating a surface state of the outer surface of the dispensing probe based on the amount of the coloring matter introduced to the second solution,
wherein
at a time before the first dispensing step and the second dispensing step, the first solution and the second solution are contained in a bottle of which an inside is partitioned by a partition,
the first dispensing probe includes a first arm which is rotatably attached to a support column, and a second arm which is rotatably attached to the first arm,
in the first dispensing step, the first solution is dispensed to the first container from the bottle, and
in the second dispensing step, the second solution is dispensed to the second container from the bottle.

12. A dispensing apparatus comprising a controller that performs the test method according to claim 1.

* * * * *